Jan. 3, 1961 G. C. DE VORE 2,966,765
APPARATUS FOR REMOVING SURFACE BLEMISHES
Original Filed Oct. 2, 1953 7 Sheets-Sheet 1

INVENTOR.
GUY C. DEVORE
BY
Oscar L. Spencer
ATTORNEY

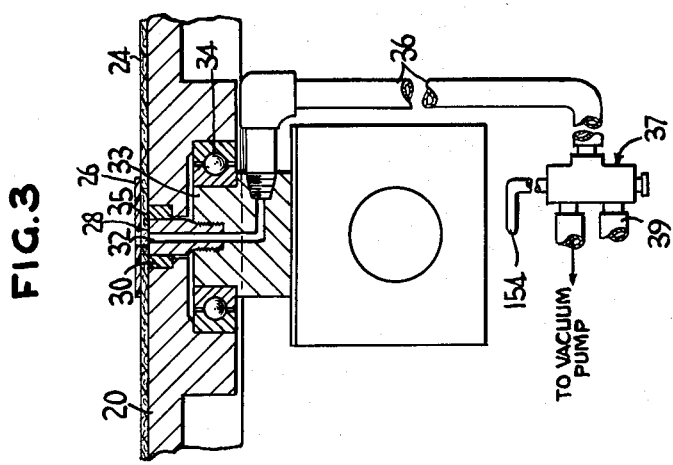
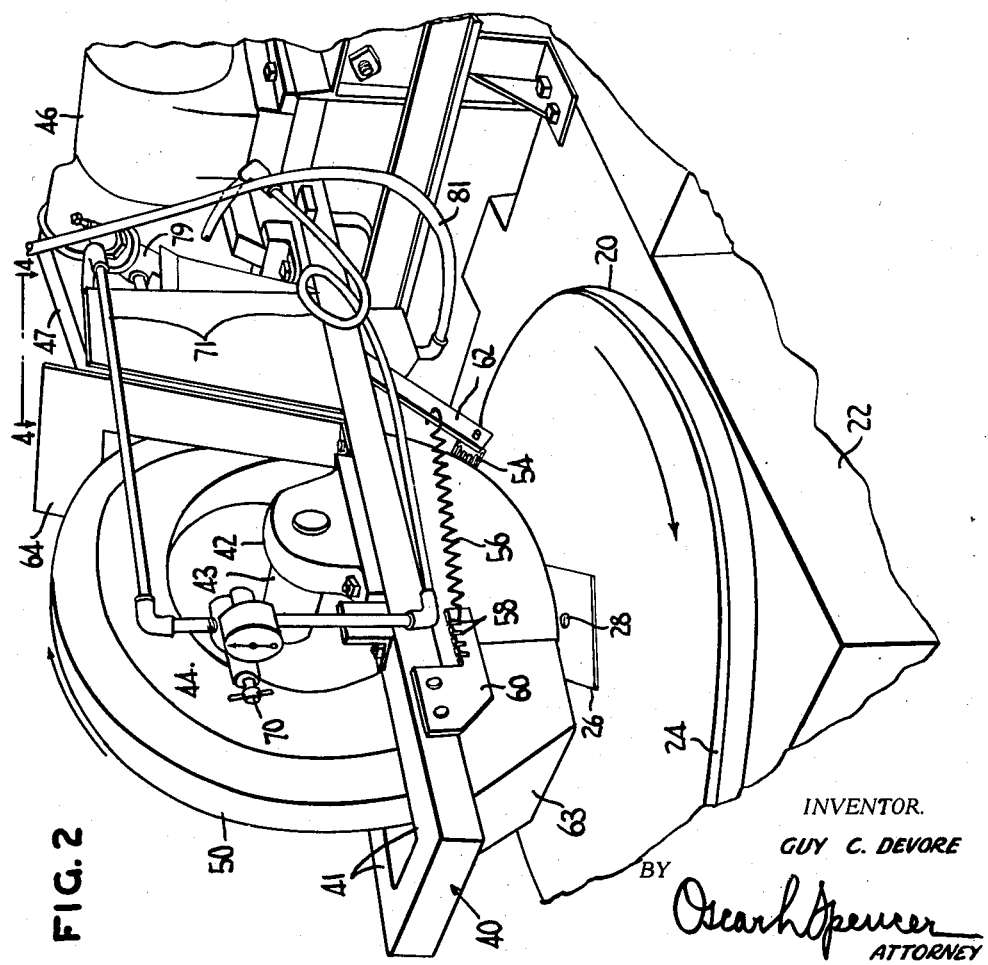

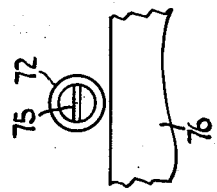
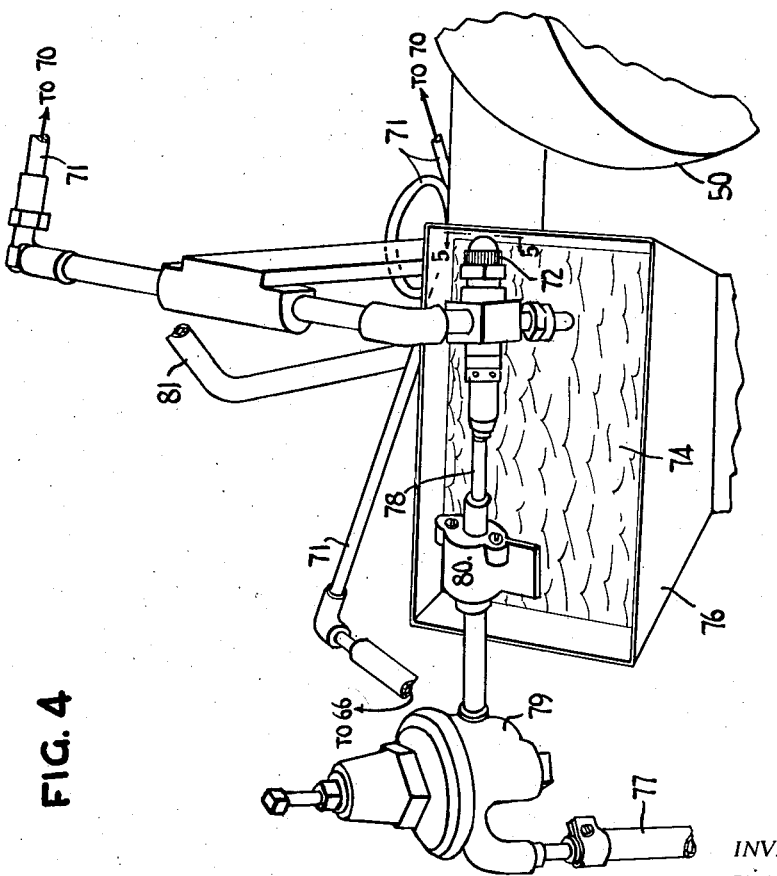

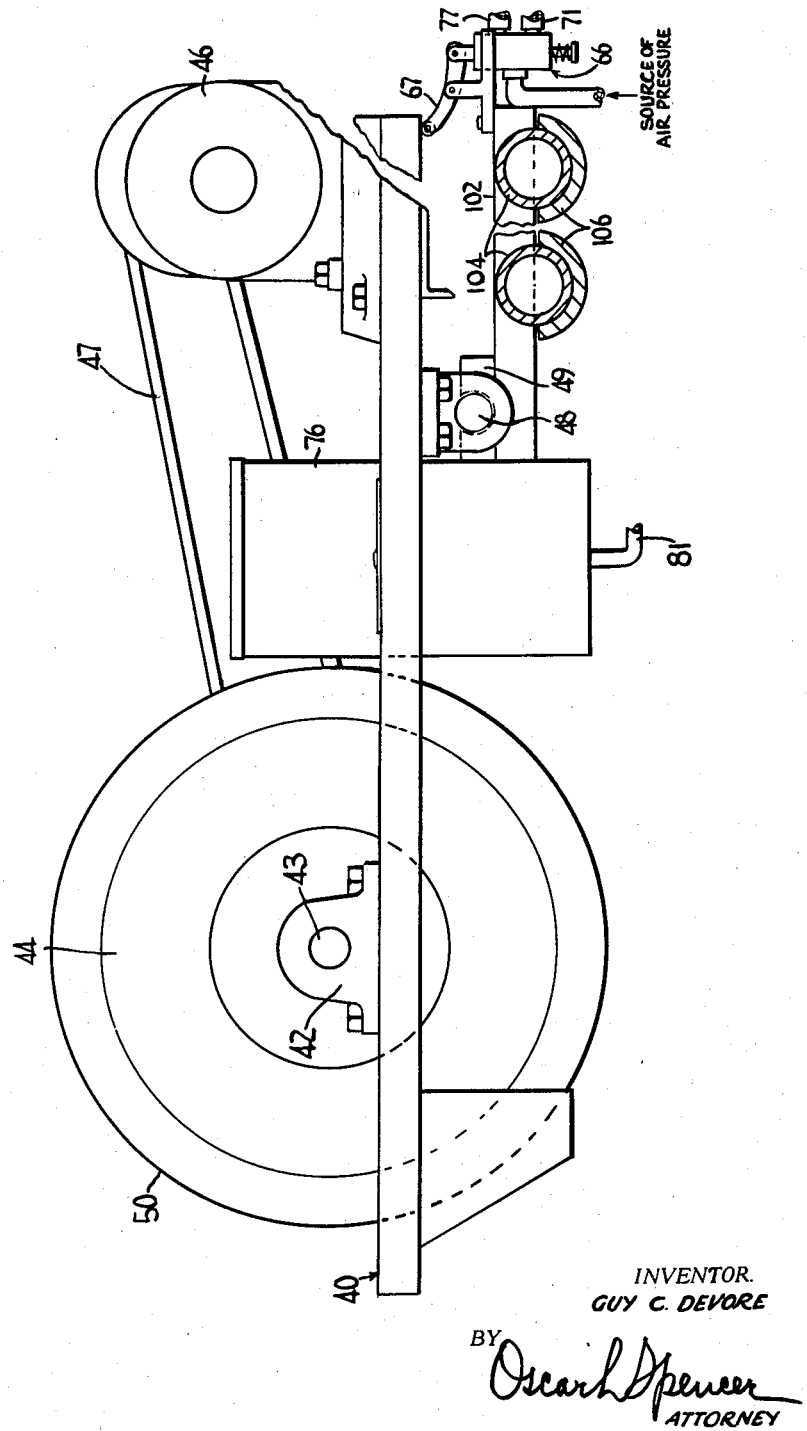

Jan. 3, 1961 G. C. DE VORE 2,966,765
APPARATUS FOR REMOVING SURFACE BLEMISHES
Original Filed Oct. 2, 1953 7 Sheets-Sheet 6
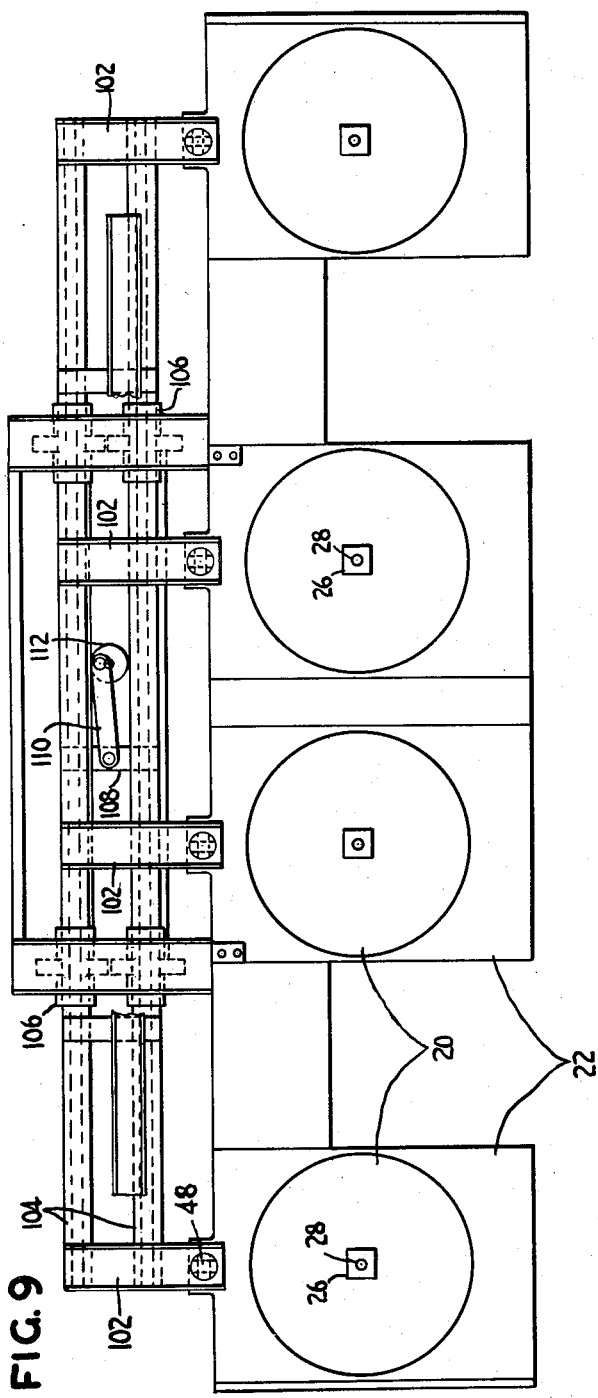
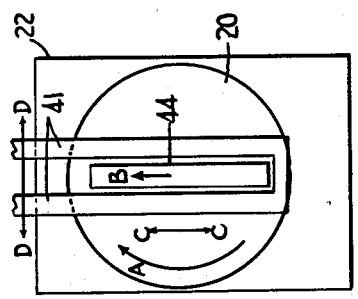
INVENTOR.
GUY C. DEVORE
BY Oscar L Spencer
ATTORNEY

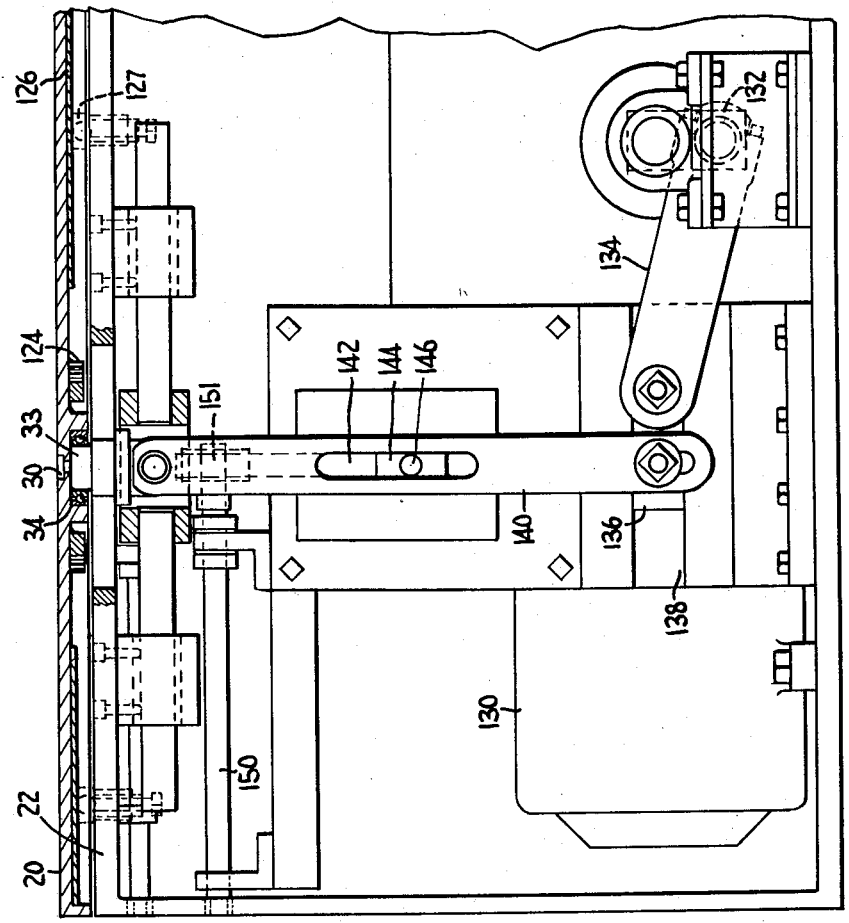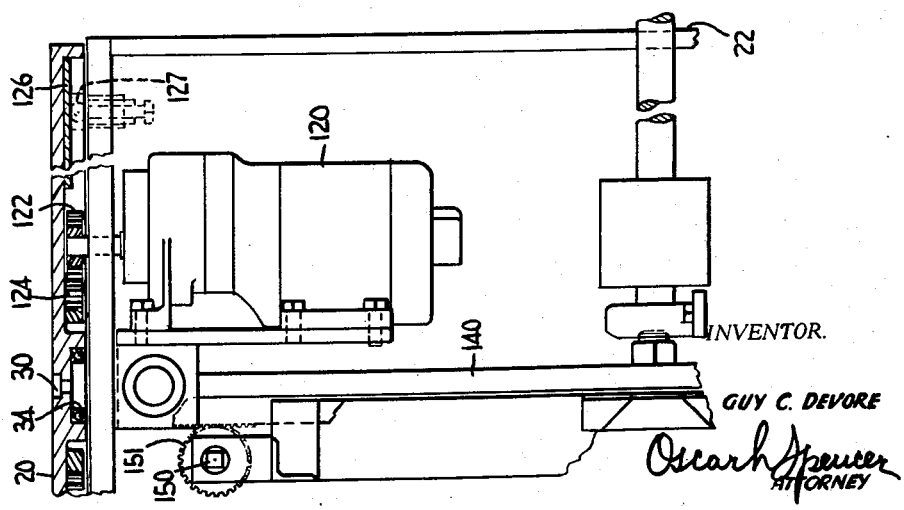

United States Patent Office 2,966,765
Patented Jan. 3, 1961

2,966,765

APPARATUS FOR REMOVING SURFACE BLEMISHES

Guy C. De Vore, Cheswick, Pa., assignor to Pittsburgh Plate Glass Company, a corporation of Pennsylvania Original application Oct. 2, 1953, Ser. No. 383,750, now Patent No. 2,910,813, dated Nov. 3, 1959. Divided and this application Feb. 18, 1959, Ser. No. 794,143

13 Claims. (Cl. 51—45)

This invention relates to apparatus for automatically removing minor imperfections from the surface of finished articles, and particularly, from articles made of glass.

In the past, surface deteriorations in the nature of rubs, sleeks, scratches, improperly placed sand blasted areas, etc., which otherwise would have caused scrapping of the glass, have been remedied by a scratch wheel technique. This technique, as practiced prior to my invention, depends upon the skill of the operator, and even the most experienced men frequently over-polish defective glass. This excess polishing causes "bull's-eyes" to result. These bull's-eyes are equally as objectionable to the optical properties of the glass as the defects to be eliminated.

The present invention eliminates the necessity for highly trained personnel to recover articles that have been blemished during their fabrication. Not only does the presently disclosed apparatus provide for more efficient elimination of blemishes, but a single, relatively unskilled operator is able to salvage four blemished articles simultaneously utilizing my improved mechanism in the time a skilled operator previously required to salvage a single article by hand polishing methods.

It is an object of the present invention to provide apparatus for remedying minor surface defects in finished articles which automatically imparts a predetermined rubbing pattern to the articles in the region of the defects.

Another object of the present invention is to provide apparatus for automatically eliminating blemishes from the surfaces of plate glass.

Another object of the present invention is to provide an automatic scratch wheel machine which, by providing a predetermined polishing action, eliminates the possibility of human error arising during the salvaging of finished articles during the removal of minor imperfections from their surfaces.

Still another object of the present invention is to provide a machine which affords considerable savings in the cost per finished article by eliminating the necessity for highly trained personnel to salvage blemished articles.

These and other objects of the present invention will become apparent upon further study of a particular embodiment of the present invention which follows.

In order to improve the understanding of the present invention relative to its use in salvaging glass, a brief definition of the various blemishes likely to occur in finished glass products is provided. A scratch is a narrow, deep defect in the surface of a glass. A sleek is similar to a scratch only it is more shallow. A rub is a wide but shallow imperfection in the surface of a glass. A chain is a series of aligned, small pits or holes in the surface of a glass.

In accordance with the teachings of the present invention, apparatus for automatically eliminating surface blemishes is provided. This apparatus holds a blemished article onto a rotatable and reciprocable support table in fixed relation thereto, and includes a reciprocable boom for supporting a rotatable scratch wheel. The boom is movable to enable the scratch wheel to contact the blemished portion of the surface of the article to be recovered. The movement of the table, the boom and the scratch wheel combine to provide a pattern of rubbing in the region of the blemish which is of sufficient depth to remove the blemish entirely and whose depth changes uniformly throughout the rubbing area. Excess removal and non-uniform rubbing of the blemished surface is thereby prevented.

By simultaneously imparting two sets of mutually perpendicular rotations and reciprocations, a circular pattern results. The heaviest concentration of this pattern is at the center. The depth of removal decreases gradually to zero at the outermost rim of the area subjected to working. The size of the area subjected to the final polish is varied by the simple expedient of varying the length of stroke of one of the mutually perpendicular reciprocating motions.

Reference is made to the accompanying description and drawings for further clarification of the principles embodied in the present invention, with special reference to the operation of a typical embodiment of an automatic scratch wheel.

In the drawings:

Figure 2 is a perspective view showing how a scratch wheel is mounted with respect to a table for holding blemished articles;

Figure 3 is a cross-sectional view showing the details of a vacuum lead to the table necessary to hold blemished articles on top thereof;

Figure 4 is an isometric view of a rouge slurry spray mechanism looking down in the direction of the arrows 4—4 of Figure 2, with certain elements eliminated to facilitate viewing;

Figure 5 is an end view along the lines 5—5 of Figure 4;

Figure 6 is a side view of selected elements of the described apparatus;

Figure 9 is a top plan view of the apparatus with practically all the apparatus shown in Figure 6 removed for clearer showing of mechanism for reciprocating the scratch wheels;

Figures 10 and 11 are mutually perpendicular side elevational views of the table structure with the table support walls removed, and showing some of the structural details provided to rotate and reciprocate the table, and not including all the structural details for clarity;

Figure 12 is a symbolic top plan view showing the interrelation of the various movements imparted to the scratch wheel used to abrade the blemished article and the table used to support same.

Figure 1:
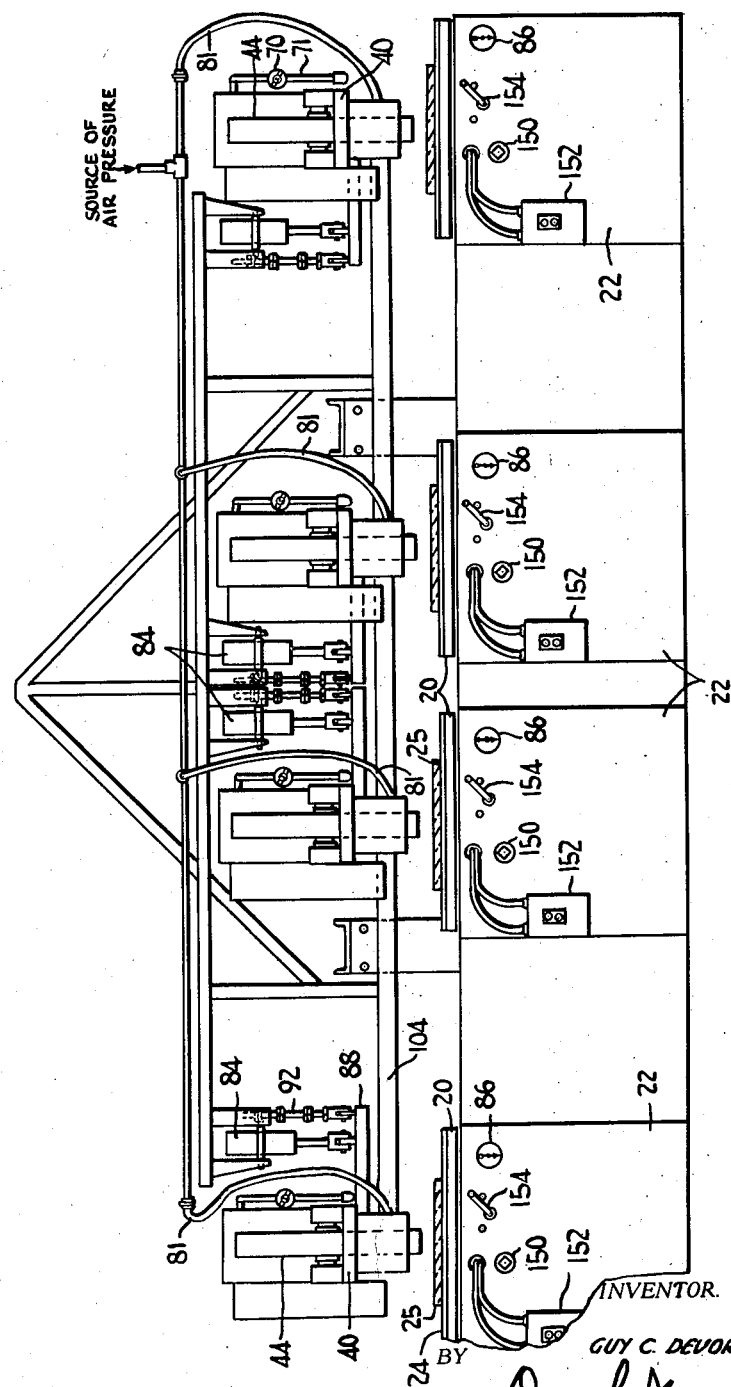
Figure 1 represents a longitudinal elevational view of a typical apparatus for providing automatic scratch wheeling.

It has been determined by time study methods that a single unskilled operator can remedy the defects present in four sheets of glass simultaneously most efficiently in utilizing the automatic mechanism herein disclosed. Hence, as shown in Figs. 1 and 2, the mechanism is preferably provided with four rotatable and reciprocable tables 20 each mounted atop a base 22. The topmost surface of each table is covered with a layer of felt 24 or other friction material that does not mar glass. A rubber pad 26 is mounted centrally of the felt layer. An aperture 28 is cut through the pad and felt in alignment with a central opening 30, as shown in Fig. 3. A pipe extension 32 is inserted within the central opening and mounted upon a base member 33. The table is maintained in rotatable relation with the base member by means of a bearing member 34. The pipe extension is connected to a flexible hose 36 leading to a vacuum pump (not shown) via a manually controlled 3-way valve 37 provided with an aperture 39 for atmospheric equalization. The rubber pad 26 and a vacuum seal 35 provide a suitable gasket for the end of the vacuum line. The reason for making the hose flexible is to maintain a vacuum coupling between the pump and the surface of the table engaging the glass despite the reciprocating motion of the table during polishing. This suction coupling maintains the glass 25 in fixed relation to the table 20.

A boom 40, which comprises a pair of parallel, interconnected boom members 41, is located above each table. An axle housing member 42 is connected to each boom member. A rod 43 between the housing members provides an axis upon which each buffing wheel 44 revolves in a vertical plane. The boom is pivoted for movement in a vertical plane about a pivot pin 48 supported at 49 (Fig. 6).

The polishing wheel 44 is moved with the boom 40 when the latter is rotated about the pivot point. When the front end of the boom is lowered, the polishing wheel engages the upper surface of a blemished article in the region above the vacuum opening 30 of the table 20.

The polishing surface 50 of the polisher wheel is made of felt. The felt surface 50 is rendered more abrasive by an abrasive slurry feed mechanism which automatically sprays an abrasive slurry to the felt surface in response to the lowering of the rotating polisher wheel, as will be explained below. The automatic feed mechanism is an element that by itself constitutes features well known in the art.

The slurry is beaten into the periphery of the rotating felt 50 by a roller 54 which is freely rotatable in friction engagement with the polisher wheel surface 50. A tension spring 56 is attachable at one end to one of a series of grooves 58 on a grooved member 60 depending from boom member 41 and fixed at its other end to a moment arm 62. Since the roller rotates on a shaft attached to the moment arm, the moment arm is rotated to bring the roller into friction engagement with the felt when the spring is engaged in one of the grooves 58. When the spring is disengaged, the moment arm rotates the roller out of engagement with the felt surface due to the action of gravity.

The abrasive slurry is sprayed onto the felt surface whenever the polishing wheel is lowered. Shields 63 and 64 are provided to insure that no rouge slurry is sprayed onto an operator during rotation of the wheel.

Referring to Figures 2, 4, 5 and 6, a four-way cam actuated valve 66 having a cam lever 67 and a plunger whose motion is synchronized with the movement of the boom 40 operates to provide a jet of air via hose 71 through a nozzle 72 when the scratch wheel is lowered onto the blemished surface, thereby sucking up abrasive slurry 74 from a slurry container 76. The pressure of the air jet is adjusted by a regulator gauge 70 (Fig. 2), thereby providing regulation of the atomization of the slurry and also the amount of slurry sucked up.

The rouge slurry may also be fed into the spray mechanism by gravity feed from an elevated container. In such case, the air jet controls the degree of atomization only.

The spray nozzle 72 is provided with a flat narrow slot 75, thereby insuring that a flat spray is directed toward the felt. When the scratch wheel is raised, the valve mechanism operates to introduce the air under pressure via line 77 and to close line 71. This action slides rod 78 against a spring actuated nozzle cleaning mechanism (not shown) within the housing for the nozzle 72. The pressure applied to slide the rod 78 is controlled by a pressure regulator 79. When the scratch wheel is lowered, the spring retracts the rod 78 within a self-bleeding air cylinder 80 and forces the nozzle cleaning mechanism toward the left, thereby providing free passage for the slurry.

It is necessary that the abrasive be uniformly dispersed throughout the slurry for uniform buffing of the blemished portion. This may be accomplished by agitating the slurry within the container 76 by means of a pressurized air feed inserted through the bottom of the container by means of a hose 81.

Returning to Figures 1 and 7, an air cylinder 84 is provided in conjunction with each boom 40. The lowering of the scratch wheel on each boom is manually controlled by tripping a timer switch 86 which controls a solenoid valve 83 which allows air in air cylinder 84 to bleed at a controlled speed via restricted valve outlet 85, thereby enabling the boom and the scratch wheel to be lowered by pivoting about pivot point 48. Lowering the scratch wheel raises a channel 88 bolted to the portion of the boom behind the pivot point 48 thereby compressing a spring 90 on front rod 92, thus limiting the pressure applied by the scratch wheel to the glass. Simultaneously, as will be obvious from Fig. 6, the rear end of the boom disengages the cam lever 67 of the 4-way valve 66, thus feeding air to the spray nozzle 72 and releasing the nozzle cleaning mechanism.

After the scratch wheel has operated on the glass for a period of time determined by a timer control circuit whose operation is controlled by controller 86 located on the front panel of the base 22, solenoid valve 83 operates to close the bleed outlet 85 and build up the pressure within the cylinder 84. This pressure increase overcomes the weight of the boom and scratch wheel and lifts the scratch wheel from the surface of the glass.

Figure 8:
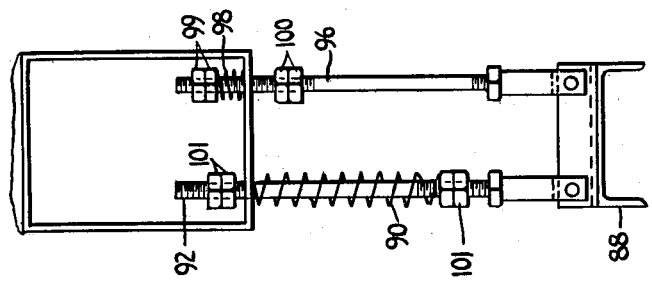
Figure 8 is a side view of a portion of the mechanism shown in Figure 7 taken along the lines 8—8 of Figure 7.
Figure 7:
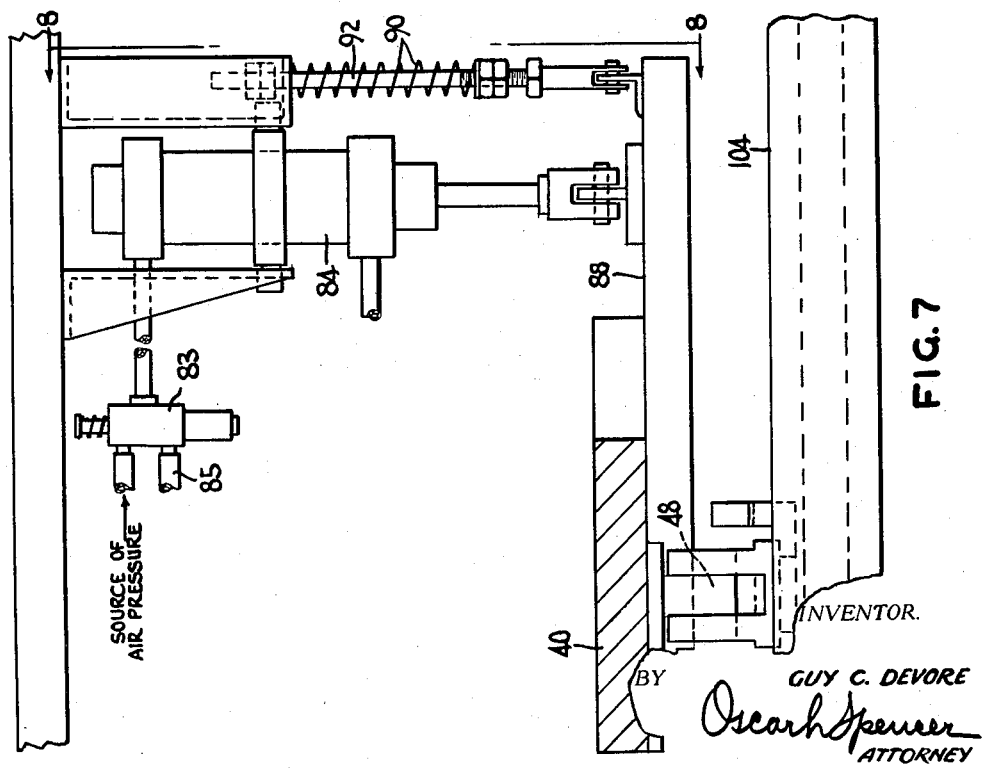
Figure 7 is an enlarged front view of mechanism for controlling the vertical movement of the scratch wheel.

Figure 8 shows a view at right angles to Figure 7. Rod 96 which is immediately behind rod 92 is provided with a small spring 98 to cushion the shock on the apparatus caused by the sudden raising of the boom. Nuts 99 limit the height the scratch wheel can be raised after the operation is completed. Vertically adjustable nuts 100 are included on rod 96 as a safety feature to control the maximum position of lowering of the scratch wheel. Vertically adjustable nuts 101 are included on rod 92 to modify the compression on spring 90, thereby modifying the pressure of the scratch wheel on the glass.

Referring to Figures 6 and 9, the various boom mechanisms are provided with support plates 102 which are interconnected by means of spaced tubes 104. The latter are slidable on grooved bearing blocks 106. A bracing member 108 which interconnects tubes 104 is attached via a moment arm 110 to an eccentric cam 112 which is rotated by a motor (not shown). The scratch wheel supporting boom 40 is cantilevered out from the sliding members 104 by balancing pivot pin 48 on support 49 welded to each cantilever support plate 102.

Figures 10 and 11 show the details for reciprocating and rotating each table 20. A motor 120 located below the table 20 drives a pinion 122 which engages an external ring gear 124 attached to the underside of the table to cause rotation of the latter. Table 20 and attached wear plates 126 rotate on bearings 127.

An additional motor 130 drives a crank 132 attached to a link 134. The end of the link away from the crank is attached to a block 136 slidable in a horizontal raceway 138. Also attached to block 136 is a shaft 140 provided with a vertically disposed slot 142. Vertically adjustable in the slot is a block 144 provided with a pivot pin 146. The upper end of the shaft 140 is swivelly connected with the member 33 about which table 22 rotates. Adjustment shaft 150 is connected to the block 144 by suitable gearing 151 to control the location of the pivot point 146 and hence the length of movement of the table.

The end of adjustment shaft 150, a switch 152 for the motor which rotates the table, vacuum valve control lever 154 which operates valve 37 to create a vacuum for holding the glass onto the table, and the timer control switch 86 which controls solenoid valve 83, are all provided at the front surface of each base 22 for the convenience of the operator.

Switches for motors controlling reciprocation of the table, reciprocation of the boom, rotation of the scratch wheel and the master control switch are included at one side of the apparatus, since these switches need not be disturbed once the apparatus is set into operation. The motions imparted by these motors do not inconvenience the operator while the latter is placing or removing glass from the table. Each blemished sheet of glass is placed with the blemish immediately above the vacuum opening, appropriate switches are thrown and the machine commences operation. The adjustment shaft 150 is cranked to accommodate for longer or shorter blemishes and the timer control 86 is adjusted for deeper or shallower blemishes.

Figure 12 shows the different motions imparted by the various moving elements of the apparatus. Each table 20 is rotatable clockwise in the direction depicted by the curved arrow A in a horizontal plane, each scratch wheel 44 is rotatable in a vertical plane in the direction of the arrow B, each table 20 is reciprocated between forward and rear positions in the direction shown by the arrows C—C, and each boom with its scratch wheel 44 is reciprocable between left and right according to the arrows depicted by D—D.

Optimum results have been obtained when the booms reciprocate five times per minute and the tables have a reciprocation period of eight seconds. The table is preferably rotated at a speed of 22.5 r.p.m. This low speed of rotation avoids movement of glass off the table in the event of vacuum failure. The scratch wheel is preferably rotated at 160 r.p.m. The combination of these individual motions results in a uniform buffing of the blemished portion of a sheet of glass resulting from the random crossings of the paths defined by the various motions imparted to the moving elements of the apparatus. This results in a pattern of glass removal such as described in the introductory portion of this disclosure.

It is understood that the particular apparatus and modes of operation described above are included for illustration and not limitation. Furthermore, the apparatus comprising the present invention is suitable for use in removing blemishes from articles made of other materials besides glass where a smoothly polished surface is desirable. Also, while the number and configuration of tables disclosed in the drawings, namely, two relatively closely spaced central tables for accommodating relatively small articles and two relatively widely spaced end tables for relatively large articles, is preferred, the invention is not limited to such a specific embodiment. The scope of the present invention is commensurate with the accompanying claims.

This application is a division of copending application, Serial No. 383,750, filed October 2, 1953, now U.S. Patent No. 2,910,813, granted Nov. 3, 1959.

What is claimed is:

1. Apparatus for removing a blemish from a localized surface portion of an article comprising at least one base, a rotatable support element mounted on the base, means for rotating said support element, means for reciprocating the support element in one direction, means for securing a surface blemished article in fixed relation to the support element, supporting means mounted for alignment with each support element, buffing means mounted on the supporting means for rotation thereon, means for rotating the buffing means, means for imparting a reciprocating motion to the supporting means transversely to the direction of reciprocation of the support element and normal to the axis of rotation of said buffing means, and means for moving the supporting means to cause contact between its rotatable buffing means and the localized surface portion of the blemished article.

2. Apparatus for removing a blemish from a localized surface portion of an article comprising at least one base, a rotatable support element mounted on the base, means for rotating said support element, means for reciprocating the support element in one direction, means for securing a surface blemished article in fixed relation to the support element, supporting means mounted for alignment with each support element, buffing means mounted on the supporting means for rotation thereon, means for rotating the buffing means, mean for imparting a reciprocating motion to the supporting means transversely to the direction of reciprocation of the support element, means for moving the supporting means to cause contact between its rotatable buffing means and the localized surface portion of the blemished article, and means for imparting all movements simultaneously.

3. Apparatus as described in claim 1 wherein means is provided for supplying an abrasive slurry to the periphery of the buffing means whenever the latter engages the surface of the blemished article.

4. Apparatus as described in claim 1, wherein the means for imparting reciprocating motions and rotations are adjusted to impart different periods of reciprocation and rotation to the means and element rotated and reciprocated.

5. An apparatus as described in claim 1 wherein the supporting means comprises a boom, a pair of parallel interconnected members for the boom, a support including a pivot engaging the interconnected members, said boom members being adjustable about the pivot in a plane perpendicular to the support element, and an axle supported between each pair of boom members for carrying a buffing wheel in the plane of adjustment of the boom for rotation thereon.

6. Apparatus as described in claim 1 wherein the means for holding the article onto each support element comprises a vacuum source, means for actuating the source, a flexible hose connected to said source, a pipe extension connected to said flexible hose, an aperture centrally located on each rotatable support element in bearing relation therewith for insertion of said pipe extension therethrough, and gasket means surrounding the opening.

7. Apparatus as described in claim 6 wherein the lowermost point of the periphery of each rotatable buffing means is aligned with the associated aperture when its supporting means is lowered into buffing position, whereby, upon aligning a blemish in the article immediately above the aperture, the surface defect is removed by a localized, uniformly varying rubbing of the surface in the region of the defect only.

8. Apparatus for removing blemishes in the surface of an article comprising at least one base, a rotatable table mounted on each base, means for reciprocating each table in one direction, means for securing a surface blemished article in fixed relation to each table, abrading means mounted in cantilever arrangement over a portion of each table, means for reciprocating each cantilever transversely to the direction of reciprocation of each table above the plane of reciprocation of the table, means for moving the abrading means into engagement with a blemished portion of the surface of the article, and means for indicating the proper location of the blemished article so that the abrading means contacts the article only in the region of a surface blemish.

9. Apparatus as in claim 8 wherein adjusting means is included for controlling the amount of abrading performed by the abrading means.

10. Apparatus as in claim 8 wherein control means is included for limiting the maximum depth of removal by abrasion.

11. Apparatus as in claim 8 wherein means is provided to impart different frequencies of rotation and reciprocation to the rotating table and the abrading means.

12. Apparatus as in claim 8 wherein means is provided for controlling the amplitude of reciprocation of the rotating table.

13. Apparatus for removing blemishes in the surface of an article comprising four bases, a rotatable table mounted on each base, means for reciprocating the tables in a horizontal plane, means for securing a surfaced blemished article in fixed relation to each table, a rotatable abrasive disc mounted in cantilever fashion above each table and rotatable in a vertically disposed plane, means for imparting a reciprocating motion to each abrading wheel transversely to the direction of reciprocation of the table, means for raising and lowering each abrasive wheel to cause contact between its periphery and the surface of the article, means for rotating each abrasive wheel, the bases being aligned in the direction of reciprocation of the abrasive wheels, the two centermost bases being spaced relatively close together to accommodate relatively small articles and the two extreme bases being separated farther from the two central bases to provide clearance for relatively large articles.

References Cited in the file of this patent

UNITED STATES PATENTS

| | | |
|---|---|---|
| 182,151 | Berry et al. | Sept. 12, 1876 |
| 1,973,511 | Schmalz | Sept. 11, 1934 |